(12) United States Patent
Masunaga et al.

(10) Patent No.: US 10,061,034 B2
(45) Date of Patent: Aug. 28, 2018

(54) SIGNAL PROCESSING DEVICE AND NOISE STRENGTH DETERMINING METHOD

(71) Applicant: FUJI ELECTRIC CO., LTD., Kawasaki-shi (JP)

(72) Inventors: Yasuyuki Masunaga, Kawasaki (JP); Takamasa Asano, Kawasaki (JP); Kazuhiro Koizumi, Kawasaki (JP)

(73) Assignee: FUJI ELECTRIC CO., LTD., Kawasahi-Shi (JP)

( * ) Notice: Subject to any disclaimer, the term of this patent is extended or adjusted under 35 U.S.C. 154(b) by 258 days.

(21) Appl. No.: 15/067,023

(22) Filed: Mar. 10, 2016

(65) Prior Publication Data
US 2016/0356896 A1 Dec. 8, 2016

(30) Foreign Application Priority Data
Jun. 3, 2015 (JP) .................................. 2015-113448

(51) Int. Cl.
*H03F 1/26* (2006.01)
*G01T 1/17* (2006.01)

(52) U.S. Cl.
CPC ........................................ *G01T 1/17* (2013.01)

(58) Field of Classification Search
CPC ........................................................ G01T 1/17
USPC .............................................................. 702/193
See application file for complete search history.

(56) References Cited

U.S. PATENT DOCUMENTS

| | | | | |
|---|---|---|---|---|
| 2005/0212528 A1* | 9/2005 | Kajita | .................... | G01R 29/26 324/613 |
| 2009/0284661 A1* | 11/2009 | Honda | .................... | H04N 5/213 348/607 |
| 2014/0009185 A1* | 1/2014 | Tsuda | .................... | G01R 31/26 324/762.01 |
| 2015/0207557 A1 | 7/2015 | Kasai et al. | | |

FOREIGN PATENT DOCUMENTS

JP      2013-135244 A      7/2013

OTHER PUBLICATIONS

J. J. Collins et al., "Stochastic resonance without tuning", Letters to Nature, vol. 376, pp. 236-238, Jul. 20, 1995.

* cited by examiner

*Primary Examiner* — Anthony Ho
(74) *Attorney, Agent, or Firm* — Rabin & Berdo, P.C.

(57) ABSTRACT

A signal processing device (1) includes a noise generator (11) configured to have a noise strength set therein and to output a noise with a set noise strength; a noise adder (12) configured to add the noise to an input signal including a weak signal as a measurement target to generate a noise-added signal; a threshold processing circuit (13) configured to perform threshold processing on the noise-added signal; an evaluating circuit (20) configured to extract, from an output signal output from the threshold processing circuit, a pulse signal component that meets a pulse waveform condition and to evaluate the extracted pulse signal; and a strength setting circuit (31) configured to set, in the noise generator, a noise strength to a desired value based on an output from the evaluating circuit.

5 Claims, 10 Drawing Sheets

FIG.5A    EXCESSIVELY SMALL NOISE STRENGTH
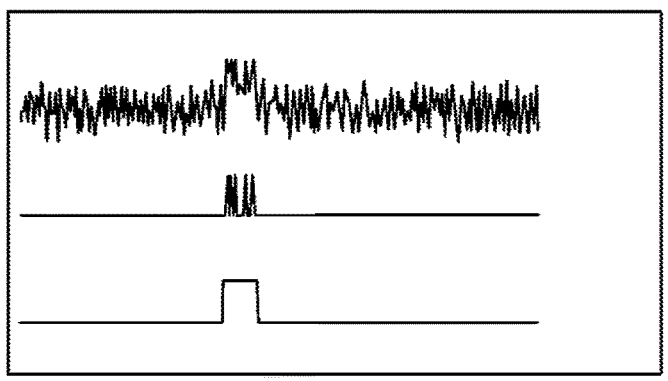
FIG.5B    OPTIMAL NOISE STRENGTH
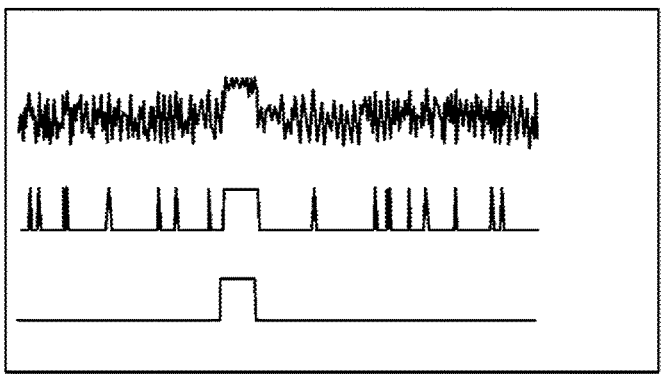
FIG.5C    EXCESSIVELY LARGE NOISE STRENGTH
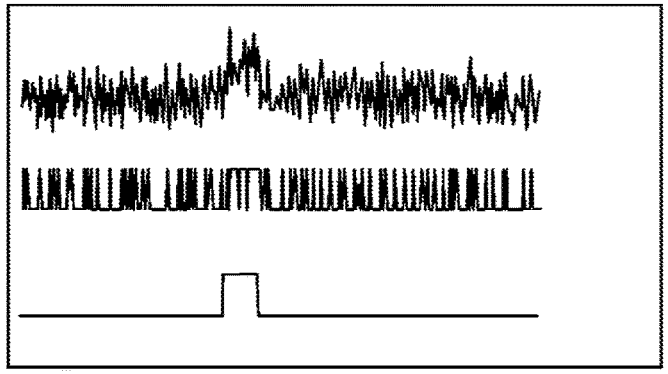

SIGNAL PROCESSING DEVICE AND NOISE STRENGTH DETERMINING METHOD

CROSS REFERENCE TO RELATED APPLICATION

This application is based upon and claims the benefit of priority from the prior Japanese Patent Application No. 2015-113448, filed on Jun. 3, 2015; the entire contents of which are incorporated herein by reference.

BACKGROUND OF THE INVENTION

1. Field of the Invention

The present invention relates to a signal processing device for detecting a weak signal and a noise strength determining method for a noise to be applied to cause stochastic resonance.

2. Description of the Related Art

Recently, there has been studied a method using stochastic resonance to detect a weak signal including a noise. For example, there has been proposed a parallel-type stochastic resonance circuit in which an input signal containing a weak signal is divided into a plurality of transmission paths and input signals propagating in the respective transmission channels are added with uncorrelated noises (for example, see J. J. Collins, Carson C. Chow, Thomas T. Imhoff, "Stochastic resonance without tuning", NATURE, Jul. 20, 1995, Vol. 376, pp. 236-238). In this parallel-type stochastic resonance circuit, a plurality of noise-added signals which are added with uncorrelated noises are subjected to threshold processing in parallel and converted into binary signals and these binary signals are combined to reproduce a weak signal. It is known that in this parallel-type stochastic resonance circuit, the accuracy of reproducing a weak signal improves as the number of multiplexed weak signals added with uncorrelated noises increases.

In order to generate a large number of uncorrelated noises, there typically need to be a large number of independent noise sources. To this end, there has been proposed a stochastic resonance circuit equipped with a reduced number of noise sources (for example, see Japanese Patent Application Publication No. 2013-135244, referred to as "JP2013-135244A" below). This stochastic resonance circuit adopts a system using a noise originally contained in an input signal to cause stochastic resonance in a weak signal. Therefore, there is no need to add noise forcibly and there is the advantage of being able to reduce noise sources that generate an uncorrelated noise.

However, in the above-mentioned parallel-type stochastic resonance circuit, in order to generate a plurality of uncorrelated noises, a plurality of noise sources need to be provided, which causes problems of complicating the circuit configuration and increasing the circuit size. In addition, as the stochastic resonance circuit disclosed in JP2013-135244A is configured to cause stochastic resonance using a noise originally included in an input signal, the noise is not always optimal for occurrence of stochastic resonance, which may bring about deterioration of an SN ratio.

SUMMARY OF THE INVENTION

The present invention was carried out in view of the foregoing and aims to provide a signal processing device and a noise strength determining method capable of improving sensitivity by stochastic resonance, without increasing the number of multiplexed weak signals added with noises and irrespective of the type of a noise included in an input signal.

One aspect of the present invention is a signal processing device including a noise generator configured to have a noise strength set therein and to output a noise with a set noise strength, a noise adder configured to add the noise to an input signal including a weak signal as a measurement target to generate a noise-added signal, and a threshold processing circuit configured to perform threshold processing on the noise-added signal. The signal processing device includes an evaluating circuit configured to extract, from an output signal output from the threshold processing circuit, a pulse signal component that meets a pulse waveform condition and to evaluate the extracted pulse signal. A strength setting circuit is configured to set, in the noise generator, a noise strength to a desired value according to an output of the evaluating circuit.

Another aspect of the present invention is characterized in that, in the above-described signal processing device, the evaluating circuit includes a pulse separator configured to extract, from the output signal output from the threshold processing circuit, the pulse signal component of a given waveform based on the pulse waveform condition. A pulse counter is configured to count the pulse signal extracted in the pulse separator.

Yet another aspect of the present invention is characterized in that, in the above-described signal processing device, the strength setting circuit sets the noise strength in the noise generator by, while a weak signal of a known pulse waveform shape is input in the noise adder, changing the noise strength set in the noise generator within a given range, obtaining a count number of a pulse signal component corresponding to each noise strength from the pulse counter and determining a noise strength indicative of a count number corresponding to a desired SN ratio to be the noise strength for signal measurement.

Still another aspect of the present invention is characterized in that, in the above-described signal processing device, the strength setting circuit optimizes the noise strength in accordance with the evaluation result output from the evaluating circuit in response to the input signal on which a background noise is overlaid at a measurement site after installment of the signal processing device.

Still another aspect of the present invention provides a signal processing device including a noise generator configured to have a noise strength set therein and to output a noise with a set noise strength, a noise adder configured to add the noise to an input signal including a measurement target signal to generate a noise-added signal, and a threshold processing circuit configured to perform threshold processing on the noise-added signal. The noise strength set in the noise generator is a noise strength that is determined based on a result of extracting a pulse signal component that meets a pulse waveform condition from an output signal from the threshold processing circuit in accordance with inputting of a weak signal of a known pulse waveform shape to the noise adder.

Still another aspect of the present invention provides a noise strength determining method in a noise strength determining method in a signal processing device. The signal processing device includes a noise generator configured to have a noise strength set therein and to output a noise with a set noise strength, a noise adder configured to add the noise to an input signal including a weak signal as a measurement target to generate a noise-added signal, and a threshold processing circuit configured to perform threshold processing on the noise-added signal. The noise strength determining method includes extracting, from an output signal output from the threshold processing circuit, a pulse signal component that meets a pulse waveform condition and evaluating the extracted pulse signal. The method includes setting, in the noise generator, a noise strength to a desired value based on evaluating the extracted pulse signal.

BRIEF DESCRIPTION OF THE DRAWINGS

FIG. 5A is a waveform chart illustrating a noise-added output and a threshold processed output of an input test signal with an extremely small noise strength;

FIG. 5B is a waveform chart illustrating a noise-added output and a threshold processed output of an input test signal with an optimal noise strength;

FIG. 5C is a waveform chart illustrating a noise-added output and a threshold processed output of an input test signal with an extremely great noise strength;

DETAILED DESCRIPTION OF THE INVENTION

With reference to the accompanying drawings, embodiments of the present invention will be described in detail below.

First Embodiment

Figure 1:
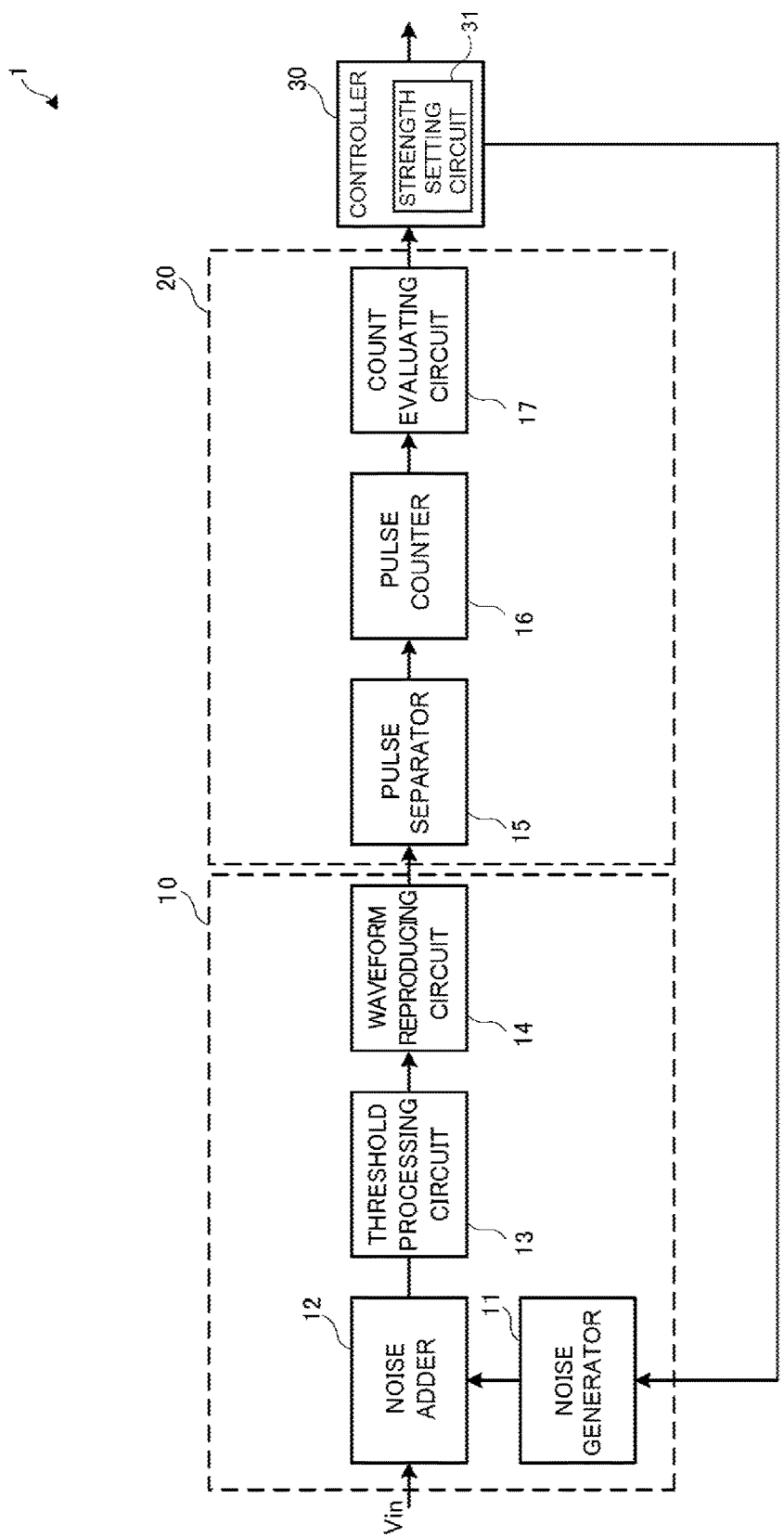
FIG. 1 is a block diagram illustrating the overall configuration of a signal processing device according to a first embodiment.

FIG. 1 is a block diagram illustrating the overall configuration of a signal processing device according to the first embodiment of the present invention. The signal processing device according to the present embodiment is applicable to various devices for detecting weak signals using stochastic resonance.

As illustrated in FIG. 1, the signal processing device 1 according to the first embodiment includes a stochastic resonance circuit 10 for causing stochastic resonance in an input signal Vin including a weak signal as a measurement target, an evaluating circuit 20 for evaluating an output signal of the stochastic resonance circuit 10, and a controller 30 for setting a noise strength of a noise that is to be applied to the input signal Vin in the stochastic resonance circuit 10.

Figure 2:
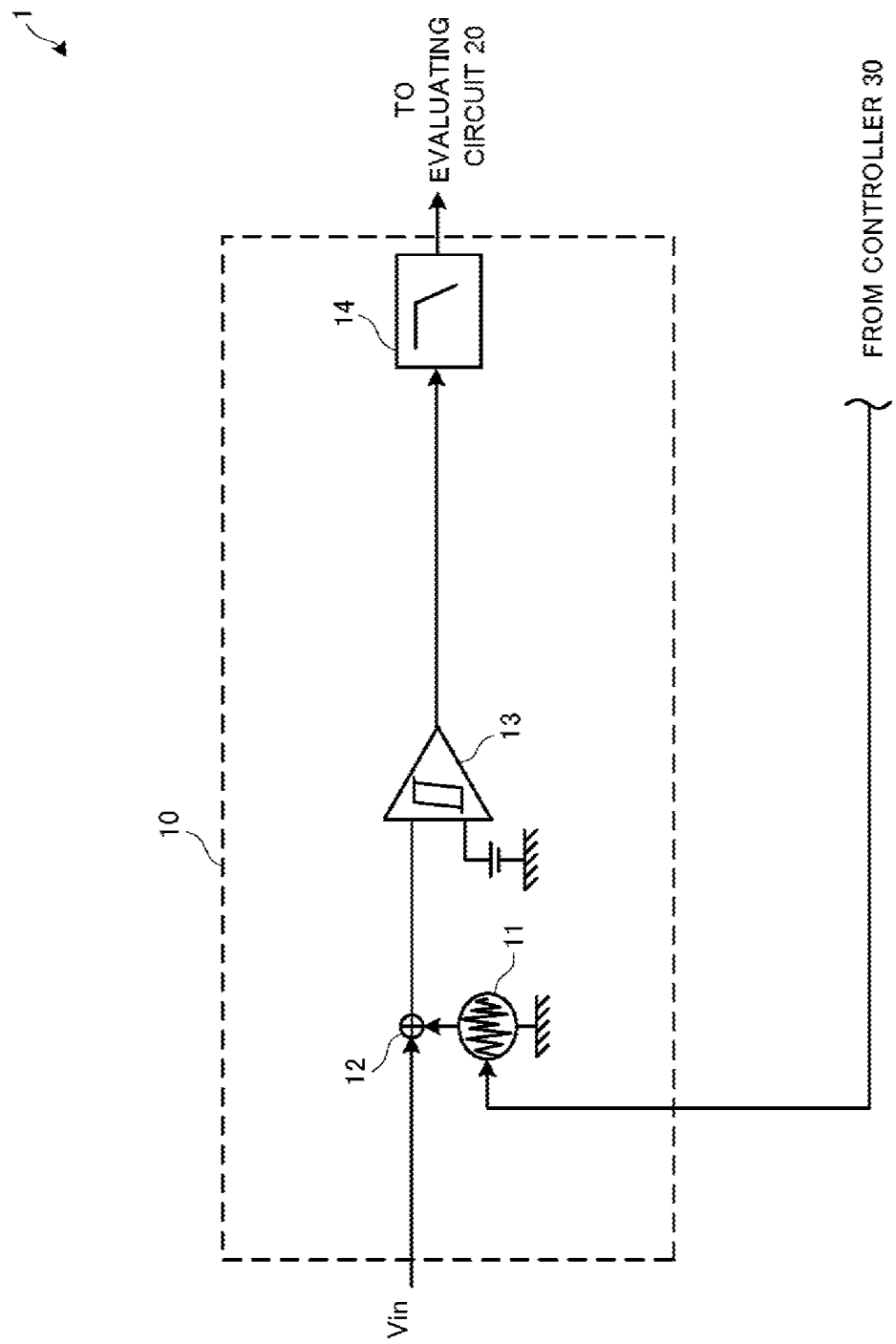
FIG. 2 is a circuit diagram of a stochastic resonance circuit of the signal processing device according to the first embodiment.

The stochastic resonance circuit 10 includes a noise generator 11 for generating a noise, a noise adder 12 for adding a noise generated in the noise generator 11 to an input signal Vin to output a noise-added signal, a threshold processing circuit 13 for performing threshold processing on a noise-added signal to generate a pulse signal, and a waveform reproducing circuit 14 for reproducing a waveform of a weak signal from an output signal output from the threshold processing circuit 13. FIG. 2 illustrates the circuit configuration of the stochastic resonance circuit 10. As illustrated in FIG. 2, the threshold processing circuit 13 is configured of a comparator having hysteresis property. In the present embodiment, the controller 30 include a strength setting circuit 31 for setting a noise strength. The strength setting circuit 31 may include, for example, circuitry for generating a particular output signal based on an evaluation signal received from the count evaluating circuit 17. The noise generator 11 is able to set the noise strength of a noise to be generated, and in the present case, the noise strength is set by the controller 30. For example, the noise generated by the noise generator 11 is a noise with same strength over a wider band that is at least wider than the frequency of a measurement target signal. The noise generated in the noise generator 11 may be a white noise, Gaussian noise (white Gaussian noise), 1/f fluctuation noise or the like. The waveform reproducing circuit 14 is configured of a low-pass filter that cuts off unwanted waveform components.

The evaluating circuit 20 includes a pulse separator 15 for separating, from an output signal of the waveform reproducing circuit 14, pulses that meet a pulse waveform condition, a pulse counter 16 that counts the pulses separated in the pulse separator 15, and a count evaluating circuit 17 for evaluating the number of pulses counted in the pulse counter 16. The pulse separator 15 uses, as the pulse waveform condition, the waveform shape of a weak signal as a measurement target. As the pulse waveform condition is adjusted to a weak signal to measure, it is possible to extract a pulse waveform component corresponding to the weak signal to measure. When using a test signal that is analogous to the weak signal as a measurement target for tuning, the pulse waveform condition may be adjusted to the test signal. The counted number in the pulse counter 16 indicates the number of pulses of a weak signal as a measurement target or a test signal separated in the pulse separator 15.

The controller 30 has the function of controlling the noise strength of stochastic resonance so as to make the counted number in the pulse counter 16 (number of measured pulses) correspond to the desired number of pulses. The desired number of pulses used is the number of pulses measured with an optimal SN ratio when the weak signal is input to the signal processing device 1. For example, when the input signal is a weak signal formed of 10 pulses, the number of pulses measured when the noise strength is optimized is ideally 10 pulses and "the desired value=10" is set as the desired number of pulses.

Figure 3:
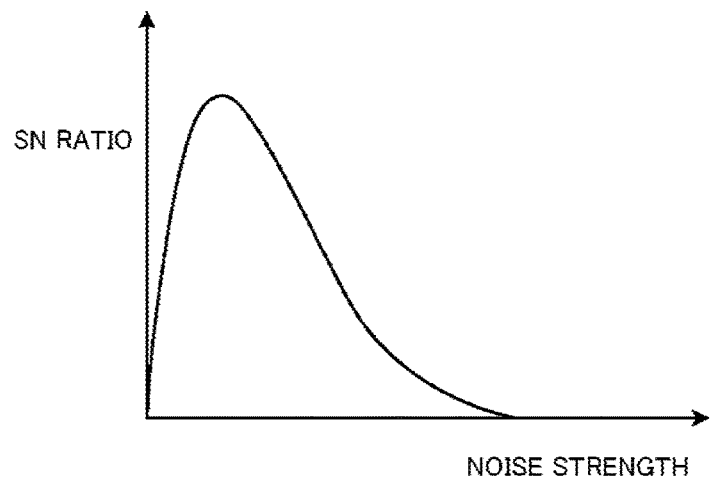
FIG. 3 is an SN characteristic diagram illustrating the relationship between noise strength and SN ratio.

Here, description is made about the desired number of pulses used in setting of the noise strength by the controller 30. FIG. 3 is an SN characteristic diagram illustrating the relationship between noise strength and SN ratio (detection sensitivity). In FIG. 3, there is shown change in the SN ratio when the noise strength of a noise added to an input signal ranges from a minimum value to a maximum value. From the SN characteristic diagram, there can be seen a noise strength that exhibits the maximum SN ratio. After the SN ratio is maximized, the noise strength is further increased. Then, the noise strength reaches an excess value, signal components other than the weak signal exceed a threshold to be pulses (noises) and the weak signal as a measurement target is buried in the noises, resulting in deterioration of the SN ratio. Then, the controller 30 sets the noise strength such that the SN ratio becomes a maximum value based on the evaluation result of the evaluating circuit 20.

Figure 4:
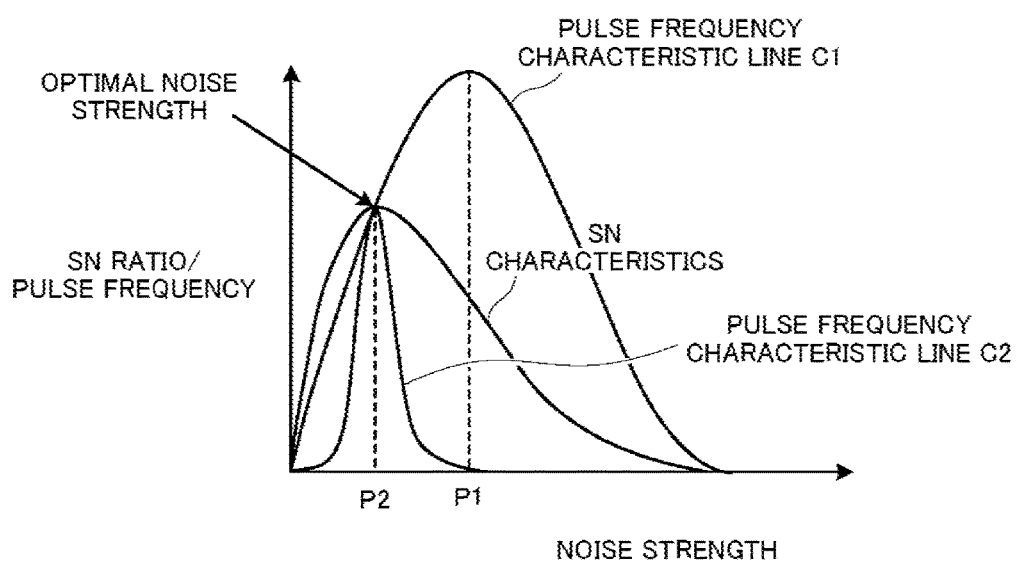
FIG. 4 is a diagram for explaining the relationship between noise strength and desired number of pulses (pulse frequency)

FIG. 4 is used to explain the relationship between noise strength and desired number of pulses (pulse frequency). The pulse frequency characteristic line C1 shown in FIG. 4 is a line obtained by monitoring the number of pulses of an output signal measured at the output stage of the threshold processing circuit 13 in FIG. 1, and the pulse frequency characteristic line C2 illustrates the number of pulses counted in the pulse counter 16 in FIG. 1. In FIG. 4, the SN characteristic diagram illustrated in FIG. 3 is also shown in an overlapping manner so as to show the relationship between pulse frequency and SN ratio. Here, measurement is made without hysteresis property in the threshold processing circuit 13.

As illustrated in the pulse frequency characteristic line C1, when the noise strength is changed from the minimum value to the maximum value, the pulse frequency increases until the noise strength reaches P1, the pulse frequency reaches a maximum value (peak) at the noise strength P1 and after the noise strength P1, the pulse frequency decreases.

In the pulse frequency characteristic line C1, the rate of pulses exceeding the threshold increases as the noise strength increases, and even after it exceeds the noise strength of the maximum SN ratio, the rate of pulses exceeding the threshold continues to increase up to the noise strength P1. After crossing the noise strength P1, direct-current (DC) components increase because the section where it exceeds the threshold continues, and thereby, the pulses seem to decrease rapidly.

On the other hand, in the pulse frequency characteristic line C2, the number of pulses (pulse frequency) exceeding the threshold is maximized at the noise strength P2 where the SN ratio is maximized. At the noise strength P2 of maximum SN ratio, for example, when weak signals S1-S10 composed of 10 pulses are input, the number of pulses that meet the pulse waveform condition (such that the pulse waveform is equal to that of the weak signal) is counted 10. However, as it goes away from the noise strength P2 of the maximum SN ratio, the number of pulses meeting the pulse waveform condition decreases. This is described, with reference to FIGS. 5A, 5B and 5C, in detail below. FIGS. 5A, 5B and 5C provide diagrams illustrating a noise-added signal (noise-added output) and a pulse signal (threshold-processed output) obtained by performing the threshold processing on the noise-added signal when a weak signal composed of 1 pulse with a given pulse waveform shape is input.

FIG. 5A illustrates a noise-added signal (noise-added output) and a pulse signal (threshold-processed output) when the noise strength is set to be smaller than the noise strength P2 such that the SN ratio is maximized. As shown, when the noise strength is smaller than the maximum SN ratio point (noise strength P2), the noise strength of a noise added to the signal is too small, and as illustrated in FIG. 5A, the probability of occurrence of stochastic resonance in a pulse part of the test signal is lowered, and the number of pulses exceeding the threshold in the threshold processing decreases, so that the pulse waveform of the test signal is not reproduced. This results in extreme reduction of the probability of meeting the pulse waveform condition and the number of pulses (pulse count) meeting the pulse waveform condition is expected to be reduced.

FIG. 5B illustrates a noise-added signal (noise-added output) and a pulse signal (threshold-processed output) when the noise strength is set to P2 where the SN ratio is maximized. At the noise strength P2 of the maximum SN ratio point, the noise strength of a noise added to the signal is appropriate and as illustrated in FIG. 5B, the pulse waveform of a test signal is reproduced precisely. As a result, the pulse waveform of a weak signal meets the pulse waveform condition with a high probability, and almost all the pulses forming the weak signals are expected to be counted. Accordingly, the number of pulses forming the weak signals is set to be "the desired value" as the desired number of pulses.

FIG. 5C illustrates a noise-added signal (noise-added output) and a pulse signal (threshold-processed output) when the noise strength is set to be larger than the noise strength P2 where the SN ratio is maximized. When the noise strength is larger than the maximum SN ratio point (noise strength P2), the noise strength of a noise added to the signal is too large, and as illustrated in FIG. 5C, the probability of occurrence of stochastic resonance becomes high even at a portion other than the pulses of the test signal. Then, the number of pulses is large, but the pulses become DC components and the probability of pulses meeting the pulse waveform condition becomes lowered. Accordingly, the pulse frequency (pulse count) of pulses meeting the pulse waveform condition is reduced.

Thus, when the noise strength is set to P2 where the SN ratio is maximized, the probability that reproduced pulses corresponding to weak signals (pulse signals) S1 to S10 that form the test signal meet the pulse waveform condition is maximized. Accordingly, by setting up the optimal noise strength P2, the number of reproduced pulse signals to be counted becomes highly probably equal to the number of pulses of the test signal. The waveform of pulses that form a test signal is set as the pulse waveform condition in the pulse separator 15 and the number of pulses that form the test signal is set to be the desired value in the controller 30. Then, the number of pulses is counted when a test signal is input by the controller 30, and the noise strength where the SN ratio is maximized is set to be the noise strength P2. Instead of the test signal, a weak signal that is actually measured in the measurement site may be used. If the waveform shape of a weak signal as a measurement target and the number of pulses per unit time are expected, a weak signal actually measured in the measurement site is used to be able to set the optimal noise strength, without using the test signal in setting the optimal noise strength.

Next, a description is provided regarding the tuning operation of setting the optimal noise strength for stochastic resonance by changing the noise strength of a noise generated by the noise generator 11 according to the present embodiment. In the following description, the noise strength is changed from the minimum value to the maximum value, but the noise strength may be changed freely within any given range.

In the present embodiment, used as a test signal to be input to the signal processing device 1 in the tuning operation is a weak signal of given pulse number (for example, 10) and a given waveform shape (amplitude, pulse width). In the pulse separator 15, the pulse waveform condition is set based on the waveform shape of the test signal. The controller 30 uses, as a desired value of an evaluation result in the count evaluating circuit 17, the number of pulses of the test signal (for example, 10 or its approximate value).

First, the controller 30 sets the noise strength of the noise generator 11 to be its minimum value. The noise adder 12 adds, to an input test signal (weak signal), a noise that is generated in the noise generator 11 and adjusted to the minimum noise strength. The threshold processing circuit 13 performs the threshold processing on a noise-added signal output from the noise adder 12 and generates a pulse signal corresponding to the test signal, however, as the noise strength is minimal, the number of pulses exceeding the threshold in the noise-added signal is smaller than that at the noise strength P2. The waveform reproducing circuit 14 reproduces the waveform of a test signal from pulses output from the threshold processing circuit 13. The pulse separator 15 uses the set pulse waveform condition and extracts pulse signal components of a given waveform that meets the condition from the output signal of the waveform reproducing circuit 14. However, as the noise strength is minimal, the number of pulse signal components of given waveform that meet the conditions is small. The pulse counter 16 counts reproduced pulses corresponding to the pulses forming the test signal reproduced in the threshold processing circuit 13. The number of pulses becomes smaller than that at the noise strength P2. The count evaluating circuit 17 evaluates the number of pulses counted in the pulse counter 16. The controller 30 compares the evaluation result of the count evaluating circuit 17 with the number of pulses of the test signal (for example, 10 or its approximate value). When the noise strength is minimized, the controller 30 is expected to count pulses that are less than pulses forming the original test signal.

Then, the controller 30 increases the noise strength of the noise generator 11 from the minimum value to the maximum value. When the noise strength of the noise generator 11 is set to the optimal noise strength P2 where the SN ratio is maximized, the processing becomes as follows. The noise adder 12 adds, to the input test signal, a noise of the optimal noise strength P2 generated in the noise generator 11. The threshold processing circuit 13 performs the threshold processing on a noise-added signal output from the noise adder 12 and generates a pulse signal corresponding to the test signal. The waveform reproducing circuit 14 reproduces the waveform of a test signal from the pulse signal output from the threshold processing circuit 13. The pulse separator 15 uses the set pulse waveform condition and extracts pulse signal components of a given waveform meeting the condition from the signal output from the waveform reproducing circuit 14. Since the noise strength is the optimal value P2, the number of pulse signal components of given waveform meeting the condition becomes maximized. The pulse counter 16 counts reproduced pulses corresponding to the pulses forming the test signal reproduced in the threshold processing circuit 13. As the noise strength is P2, the number of pulses is maximized. The count evaluating circuit 17 evaluates the number of pulse signals counted at the pulse counter 16. The controller 30 compares the evaluation result of the count evaluating circuit 17 with the number of pulses of the test signal (for example, 10 or its approximate value). In the controller 30, when the noise strength is the optimal value P2, the number of pulses of the test signal is expected to be the desired value of the evaluation result and the noise strength P2 is determined to be the noise strength indicating the desired value of the evaluation result.

Next, a description is provided regarding the case where the controller 30 sets the noise strength of the noise generator 11 to be a greater value (for example, maximum value) than the optimal point. When the noise strength is maximized, the noise strength of a noise added to a weak signal is too large, the threshold-processed output highly probably becomes DC in the threshold processing circuit 13, and in the pulse separator 15, the number of pulse signals that do not meet the pulse waveform condition increases. Accordingly, the number of pulses counted in the pulse counter 16 highly probably becomes smaller than the number of pulses of the test signal. In the controller 30, the number of pulses of the test signal is unlikely to be the desired value of the evaluated result. Therefore, in the controller 30, when the noise strength is maximized, a smaller number of pulses than the pulses forming pulse signals of the original test signal are counted.

Then, the controller 30 set the noise strength by determining the noise strength such that the number of pulses counted in the pulse counter 16 indicates "the desired value" that is the same count number as the number of pulses of the test signal or its approximate value to be the optimal noise strength P2 in the noise generator 11. The controller 30 may determine the optimal noise strength P2 not by detecting the number of pulse signals that is equal to the number of pulses of the test signal, but by determining the noise strength such that the number of pulses is maximized to be the optimal noise strength. The "desired value" of this case is the maximum number of pulses.

Figure 6:
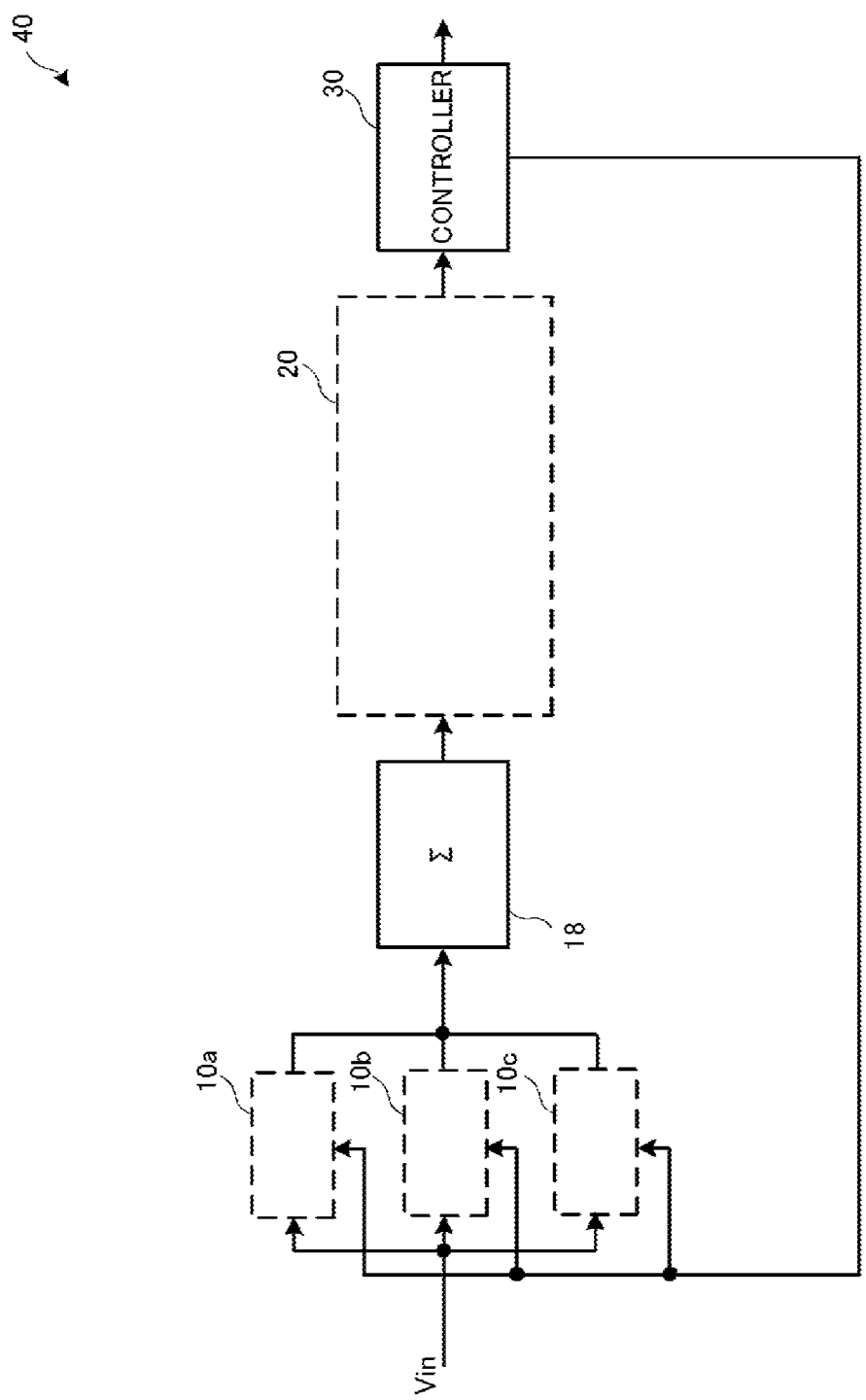
FIG. 6 is a diagram illustrating the configuration of a signal processing device according to a modified example of the first embodiment.

As described above, according to the present embodiment, as the pulse signal components that meet the pulse waveform condition are extracted from the output signal of the stochastic resonance circuit 10, it is possible to extract the pulse waveform components corresponding to the weak signal as a measurement target. Then, as the noise strength such that the evaluation result of the extracted pulse waveform components shows the desired value is set in the noise generator 11, it is possible to set the noise strength P2 for achieving the optical SN ratio in the noise generator 11. According to the first embodiment, the single stochastic resonance circuit 10 is provided, however, as illustrated in FIG. 6, a signal processing device 40 may include a plurality of stochastic resonance circuits 10a to 10c in parallel and outputs from the respective stochastic resonance circuits 10a to 10c may be combined in an adding section 18.

In the present embodiment, tuning for optimizing the noise strength for a weak signal as a measurement target included in an input signal may be performed at the preliminary step before factory shipment of the signal processing apparatus 1 or may be performed after installation of the device and while a background noise is overlaid on an input signal Vin at a measurement site. When performing tuning in the preliminary step before factory shipment, the signal is not affected by the background noise that fluctuates at the measurement site. Therefore, it is possible to set the noise strength for all the devices under uniform conditions (or under expected conditions) thereby to obtain calibration data inherent to the device. On the other hand, when performing tuning at the measurement site, it is possible to determine the noise strength in consideration of measurement conditions such as the background noise that fluctuates depending on measurement site (such as ambient temperatures, and so on) thereby to be able to set an optimal noise strength for each measurement site.

Second Embodiment

The second embodiment describes an example of application of the signal processing device 1 according to the above-described first embodiment to a radiation measuring device.

Figure 7:
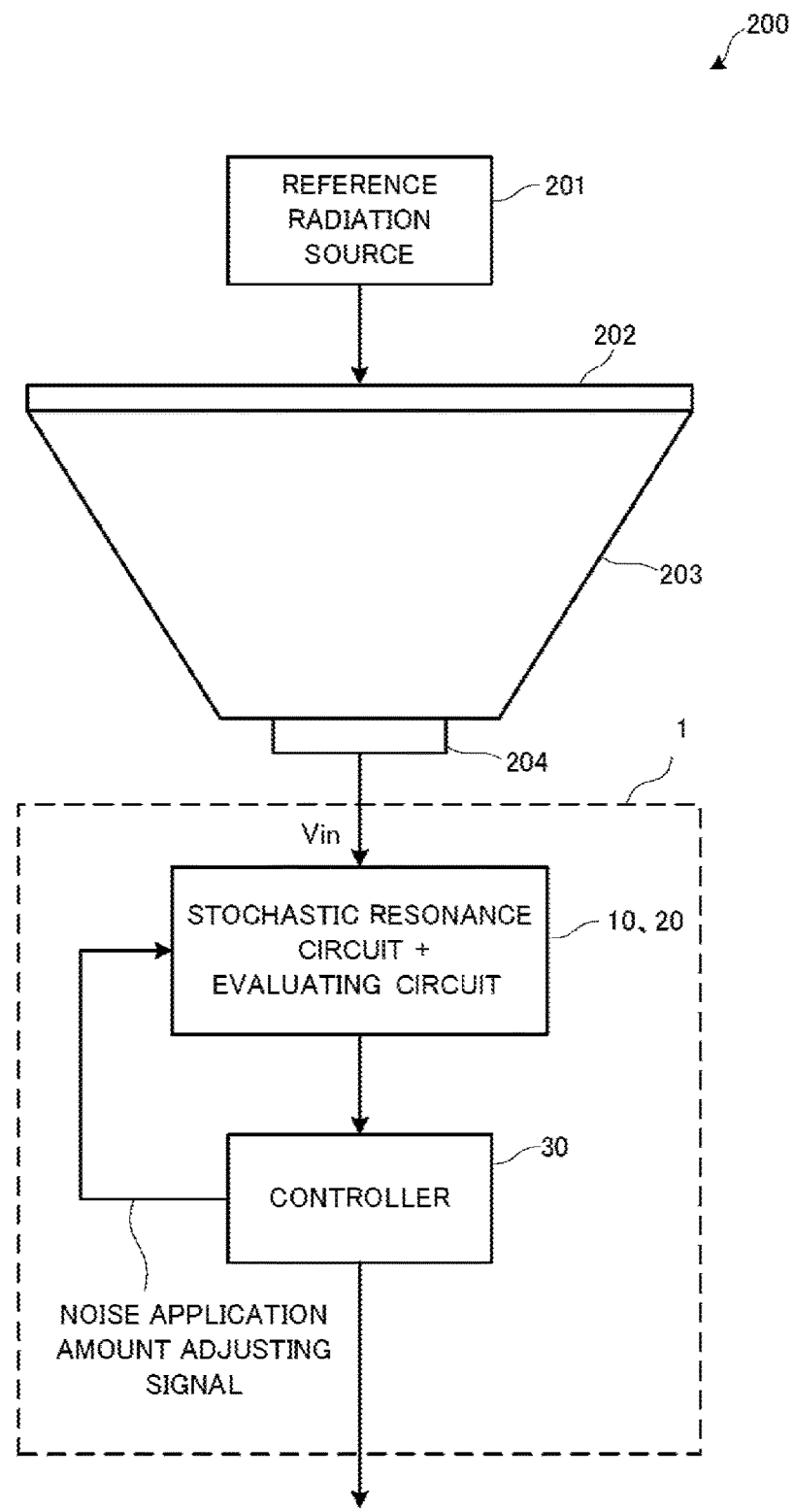
FIG. 7 is a block diagram illustrating the configuration of a radiation measuring device according to a second embodiment.

FIG. 7 is a block diagram illustrating the configuration of a radiation measuring device according to the second embodiment. In the second embodiment, stochastic resonance is used to achieve improvement of the accuracy of detecting radiation (SN ratio). Here, the radiation measuring device to which the signal processing device 1 is applicable is not limited to the configuration illustrated in FIG. 7.

The radiation measuring device 200 has a scintillator 202 for generating light in accordance with input radiation, alight guide 203 for causing reflection of light generated in the scintillator 202, a light detector 204 for outputting a weak signal in accordance with light guided by the light guide 203 and a signal processing device 1 according to the first embodiment. When receiving radiation from the outside, the scintillator 202 generates scintillation light (fluorescence) in accordance with energy that the scintillator 202 receives from the radiation. The light guide 203 is apparently tapered-shaped and the scintillator 202 is arranged at an end of large area. And the light detector 204 is arranged at the other end of small area. The scintillation light input to the light guide 203 reflects in the light guide 203 repeatedly and arrives at the light detector 204. The light detector 204 outputs a weak signal in accordance with the amount of incident light of the scintillation light by the photo-electric effect and inputs an input signal Vin including this weak signal to the stochastic resonance circuit 10.

Next, a description is provided regarding the tuning operation for setting the optimal noise strength at the radiation measuring device 200 by using a reference radiation source 201. The pulse waveform shape and the number of pulses (the radiation amount per unit time) of a radiation detection signal (weak signal as a measurement target) output from the light detector 204 by radiation emitted from the reference radiation source 201 are known. Then, the pulse waveform of the radiation detection signal is set to be the pulse waveform condition and the number of pulses of the radiation detection signal is set to the desired number of pulses.

In the tuning operation, the reference radiation source 201 is installed on the scintillator 202. Then, the controller 30 performs the same tuning operation as that of the first embodiment and takes an weak signal output from the light detector 204 as an input signal and sets the noise strength of the noise generator 11 so that the number of pulse signals counted in the pulse counter 16 conforms to the desired number of pulses. The controller 30 sets the noise strength of the noise generator 11 by using a noise application amount adjusting signal. Through this process, it is possible to set the optimal noise strength to the noise generator 11 in the radiation measuring device 200 according to the second embodiment.

After the tuning operation, the reference radiation source 201 is displaced from the radiation measuring device 200 and the main measurement starts.

In this way, according to the second embodiment, it is possible to improve the SN ratio (measurement sensitivity) for a weak signal as a detection target (radiation) by stochastic resonance. In this embodiment, as the measurement sensitivity for a weak signal as a detection target is increased, even if the light detector 204 used has lower sensitivity than a conventional one, it is possible to detect the radiation with sufficient sensitivity, which leads to cost saving of the radiation measuring device 200.

Third Embodiment

The third embodiment provides an example of application of the signal processing device 1 according to the above-described first embodiment to an optical device.

Figure 8:
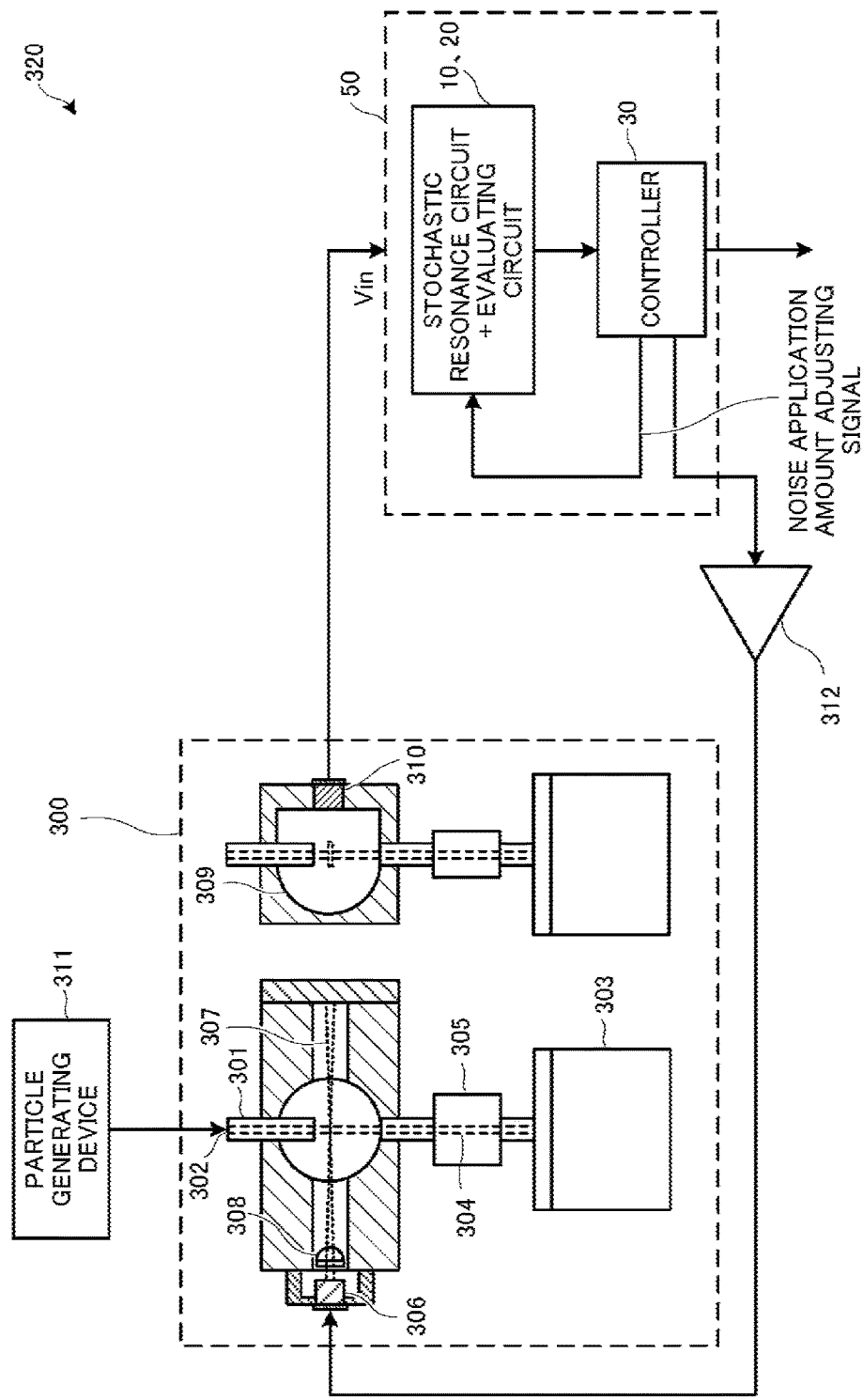
FIG. 8 is a block diagram illustrating the configuration of an optical device according to a third embodiment.

FIG. 8 is a block diagram illustrating the configuration of the optical device according to the third embodiment. In the third embodiment, stochastic resonance is used to improve the detection accuracy (SN ratio) of fine particles contained in air. The optical device to which the signal processing device 1 is applicable is not limited to that illustrated in FIG. 8. First, a particle sensor that forms the optical device according to the third embodiment is described with reference to FIGS. 9A and 9B.

Figure 9B:
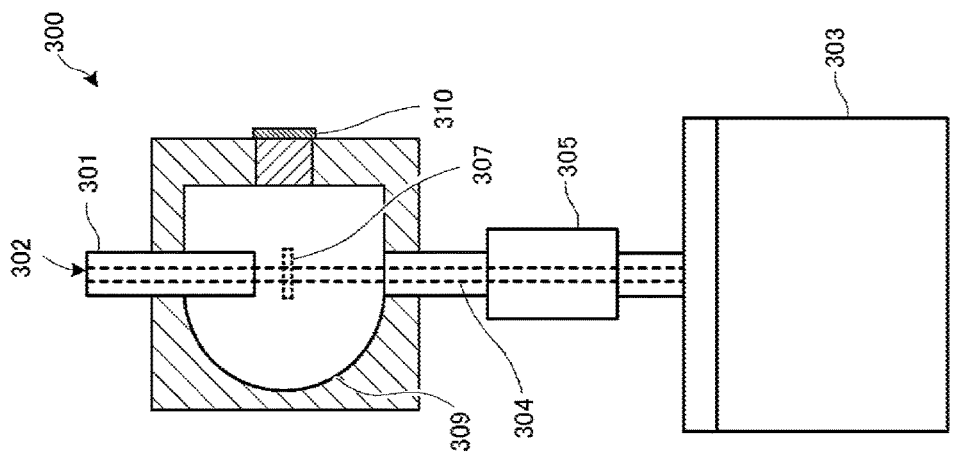
FIG. 9B is a side view of the particle sensor of the optical device according to the third embodiment.
Figure 9A:
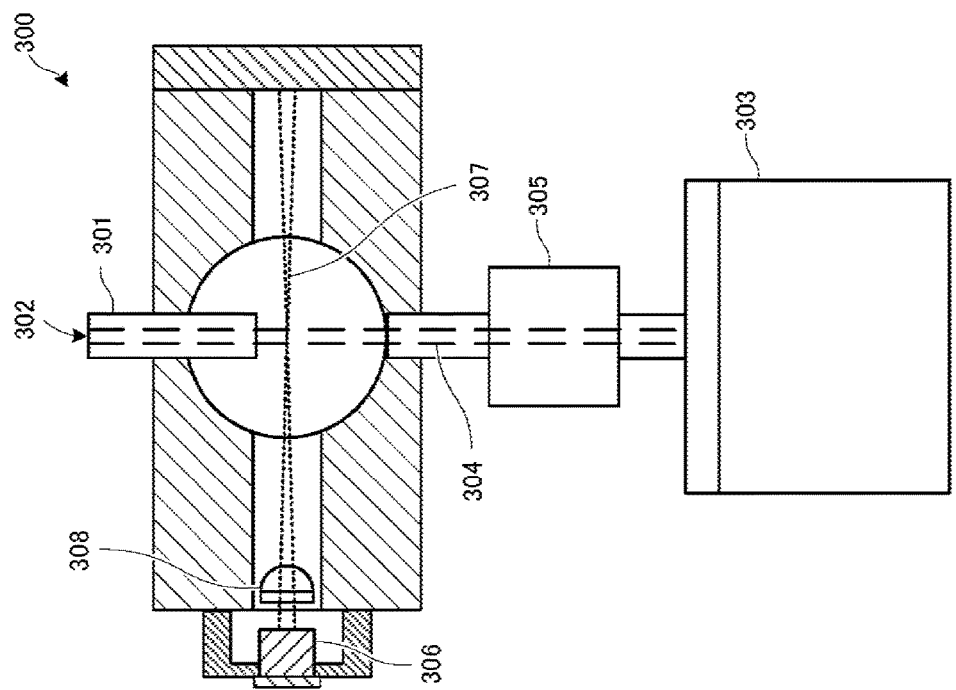
FIG. 9A is a front view of a particle sensor of the optical device according to the third embodiment.

FIGS. 9A and 9B provide a front view and a side view of the particle sensor according to the third embodiment respectively.

In the particle sensor 300, a fan motor 303 is used to suck air 304 from the outside of the particle sensor 300, via an air suction opening 302 provided in a hose-shaped nozzle 301, to the inside of the particle sensor 300. The flow rate of the air 304 is measured by a flow rate sensor 305. Laser light 307 generated in a semiconductor laser 306 is condensed, by a lens 308, near the position of the nozzle 301 as a flow path of the air 304 inside the particle sensor 300. Then, the condensed laser light 307 is applied to fine particles contained in the air 304 sucked in the particle sensor 300 from the outside of the particle sensor 300. Then, a concave mirror 309 provided inside the particle sensor 300 is used to condense scattering light generated from the fine particles by irradiation of the laser light 307, to a photodiode 310. In the photodiode 310, the received scattering light is converted into electric signals thereby to perform measurement of the fine particles contained in the air. The position of the nozzle 301 where the laser light 307 is condensed is approximately the center of the concave mirror 309 provided inside the particle sensor 300.

Next, a description is provided, with reference to FIG. 8, about the overall configuration of the optical device 320. The optical device 320 has a particle generating device 311 for generating fine particles that are contained in the air 304 sucked to the inside of the particle sensor 300. An output signal from the photodiode 310 including a weak signal in accordance with received scattering light is input to the signal processing device 50 as an input signal Vin. The signal processing device 50 is equivalent in basic function to the signal processing device 1 according to the first embodiment, but the controller 30 further has a necessary function of the particle sensor 300. For example, the controller 30 may control the laser light 307 generated by the semiconductor laser 306 by a drive circuit 312. The signal processing device 50 is configured to have a stochastic resonance circuit 10, an evaluating circuit 20 and a controller 30.

Figure 10:
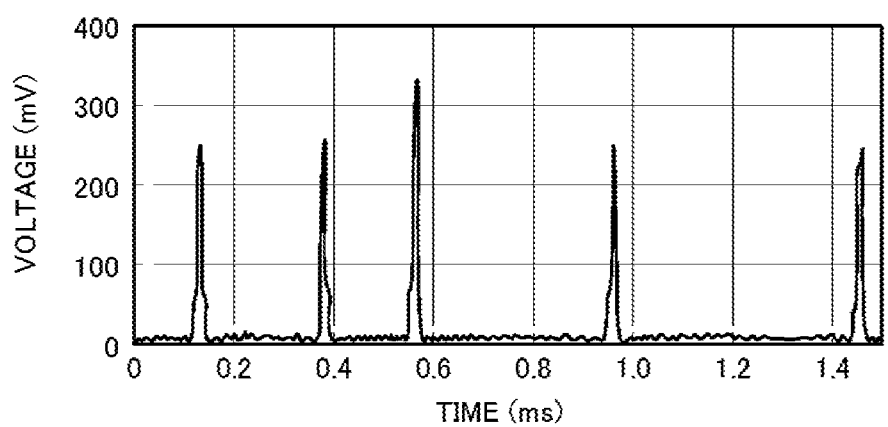
FIG. 10 is a pulse waveform chart of scattering light according to the third embodiment.

Next, a description is provided regarding the tuning operation for setting the optimal noise strength using the particle generating device 311. When the size of a fine particle generated from the particle generating device 311 is known, the pulse waveform shape of a weak signal as a measurement target output from the photodiode 310 in accordance with scattering light and the number of pulses (weak signal formed of pulses illustrated in FIG. 10) are known. Then, the pulse waveform shape of a weak signal corresponding to scattering light is set to the pulse waveform condition and the number of pulses of the weak signal corresponding to the scattering light is set to the desired number of pulses.

The controller 30 performs the same tuning operation as that in the first embodiment and sets the noise strength of the noise generator 11 so that the number of pulses counted in the pulse counter 16 corresponding to the weak signal output from the photodiode 310 conforms to the desired number of pulses. In addition, the controller 30 uses a noise application amount adjusting signal as a basis to set the noise strength of the noise generator 11. With this process, the tuning operation is enabled in the optical device 320 according to the third embodiment.

Thus, according to the third embodiment, it is possible to improve the SN ratio (measurement sensitivity) for a weak signal as a detection target (scattering light) by stochastic resonance. In the present embodiment, as the measurement sensitivity is improved for the weak signal as a detection target, it is possible to detect scattering light of even small fine particles that are too small to monitor by a conventional device.

Fourth Embodiment

The fourth embodiment provides an example of application of the signal processing device 60 according to the above-described first embodiment to a distance measuring device.

Figure 11:
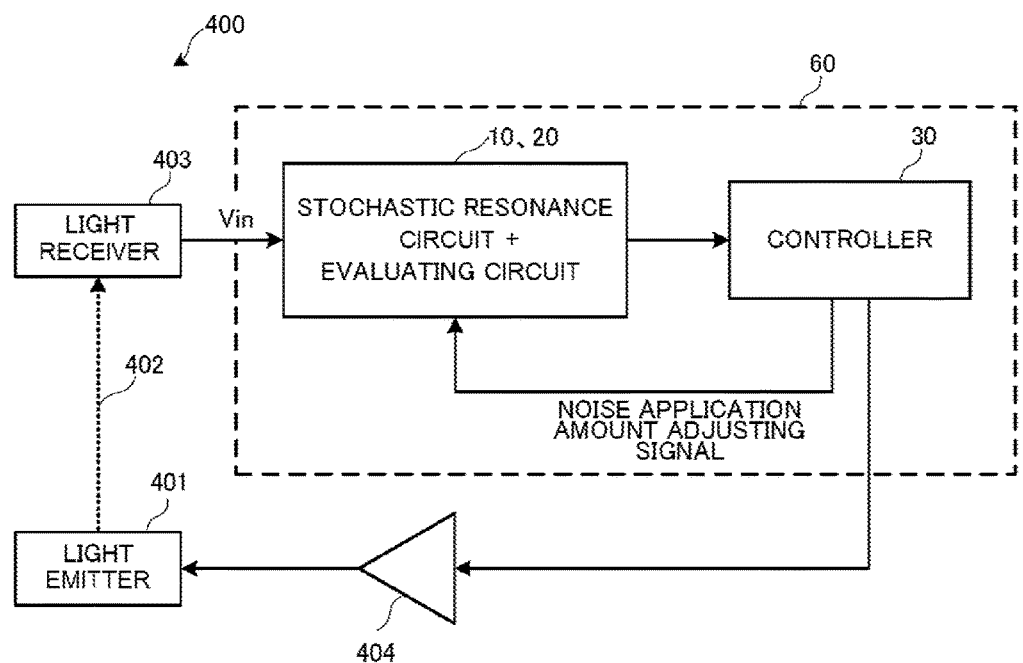
FIG. 11 is a block diagram illustrating the overall configuration of a distance measuring device according to a fourth embodiment.

FIG. 11 is a block diagram illustrating the overall configuration of a distance measuring device according to the fourth embodiment. In the fourth embodiment, stochastic resonance is used to increase the measurable distance in distance measurement. The distance measuring device to which the signal processing device 60 is applicable is not limited to that illustrated in FIG. 11.

The distance measuring device 400 is configured to have a light emitter 401 for transmitting light emitting signals (transmitting pulse signals), a light receiver 403 for receiving light emitting signals 402 transmitted from the light emitter 401, a signal processing device 60 for receiving an input signal Vin including an weak signal output from the light receiver 403, and a drive circuit 404 for controlling transmission of light emitting signals 402 by the light emitter 401. The signal processing device 60 is equivalent in basic function to the signal processing device 1 according to the first embodiment, but the controller 30 is configured to have a necessary function of the distance measuring device. The signal processing device 60 is configured to have a stochastic resonance circuit 10, an evaluating circuit 20 and a controller 30.

Figure 12:
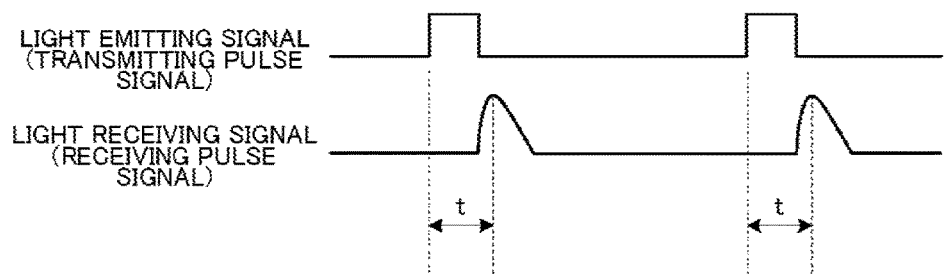
FIG. 12 is a timing chart for explaining the principle of distance measurement.

First description is made about the distance measuring operation in the distance measuring device 400. FIG. 12 is a timing chart for explaining the principle of distance measurement, and shows the waveforms of a light emitting signal transmitted from the light emitter 401 and a light receiving signal (light receiving pulse signal) received in the light receiver 403. The controller 30 is able to know the transmission timing of transmitting a light emitting signal from the light emitter 401 by controlling the drive circuit 404 and also know the reception timing of receiving a light receiving signal by notification from the light receiver 403. The controller 30 is able to measure the distance between the light emitter 401 and the light receiver 403 based on a time difference t between the light emitting signal and the light receiving signal. The distance is measured by measuring the time t in which a light emitting signal (light) transmitted from the light emitter 401 propagates in air and is received as a light receiving signal by the light receiver 403. Assuming that the light speed in air is c [m/s], the distance between the light emitter 401 and the light receiver 403 can be obtained by x [m]=t [s]*c. As the controller 30 is able to know the time t, this equation is used to be able to know the distance x between the light emitter 401 and the light receiver 403.

Next, a description is provided regarding the tuning operation for setting the optimal noise strength for causing stochastic resonance in a weak signal (light receiving signal) input from the light receiver 403 to the signal processing device 60 in the distance measuring device 400. It is assumed that the number of pulses and the pulse waveform shape of a light receiving signal (light receiving pulse signal) are known. The signal processing device 60 is configured to set the pulse waveform of a light receiving signal to be the pulse waveform condition and also set the number of pulses of a light receiving signal to be the desired number of pulses.

The controller 30 performs the same tuning operation as that in the first embodiment, and determines the noise strength of the noise generator 11 such that the number of pulses in the pulse counter 16 of a signal corresponding to a weak signal input from the light receiver 403 conforms to the desired value (desired number of pulses) and sets it to the noise generator 11. In addition, the controller 30 sets the noise strength of the noise generator 11 using a noise application amount adjusting signal. With this process, it is possible to perform tuning to the optimal noise strength in the distance measuring device 400 according to the fourth embodiment.

Thus, according to the fourth embodiment, it is possible to improve the SN ratio (measurement sensitivity) for a weak signal as a detection target (light receiving signal) by stochastic resonance. In the present embodiment, as the measurement sensitivity for a weak signal as a detection target is improved, it is possible to increase the distance to measure between the light emitter 401 and the light receiver 403.

The above description has been made about a system in which the light receiver 403 is located at the distance measurement target position. However, it may be applicable to a reflection-type distance measuring device. For example, light may be received by a light receiver 403 arranged at the same position of the light emitter 401 by making a light emitting signal transmitted from the light emitter 401 reflect on a reflection mirror provided at the range target position. For example, it may be configured that a mirror is arranged at the position of the light receiver 403 in FIG. 11 and the light receiver 403 is arranged at the same position as the light emitter 401.

The present invention is not limited to the above-described embodiments and may be embodied in various modified forms. In the above-described embodiments, the size and shape are not limited to those illustrated in accompanying drawings, and may be modified appropriately as far as the effects of the present invention can be exerted. Other modifications may be also made appropriately without departing from the scope of the object of the present invention.

What is claimed is:
1. A signal processing device comprising:
a noise generator configured to have a noise strength set therein and to output a noise with a set noise strength;
a noise adder configured to add the noise to an input signal including a weak signal as a measurement target to generate a noise-added signal;
a threshold processing circuit configured to perform threshold processing on the noise-added signal;
an evaluating circuit configured to extract, from an output signal output from the threshold processing circuit, a pulse signal component that meets a pulse waveform condition and to evaluate the extracted pulse signal; and a strength setting circuit configured to set, in the noise generator, a noise strength such that an evaluation result in the evaluating circuit represents a desired value, wherein the strength setting circuit sets the noise strength in the noise generator by, while a weak signal of a known pulse waveform shape is input in the noise adder, changing the noise strength set in the noise generator within a given range, obtaining a count number of a pulse signal component corresponding to each respective level of noise strength from a pulse counter that counts pulses based on the output signal from the threshold processing circuit, and determining a desired noise strength indicative of a count number corresponding to a desired SN ratio to be the noise strength for signal measurement.

2. The signal processing device according to claim 1, wherein the evaluating circuit comprises:

a pulse separator configured to extract, from the output signal output from the threshold processing circuit, the pulse signal component of a given waveform based on the pulse waveform condition; and the pulse counter configured to count a number of pulses in the pulse signal extracted in the pulse separator.

3. The signal processing device according to claim 1, wherein the strength setting circuit optimizes the noise strength in accordance with an evaluation result output from the evaluating circuit in response to the input signal on which a background noise is overlaid at a measurement site after installment of the signal processing device.

4. A signal processing device comprising:

a noise generator configured to have a noise strength set therein and to output a noise with a set noise strength;

a noise adder configured to add the noise to an input signal including a measurement target signal to generate a noise-added signal; and a threshold processing circuit configured to perform threshold processing on the noise-added signal, wherein the noise strength set in the noise generator is a noise strength that is determined based on a result of extracting a pulse signal component that meets a pulse waveform condition from an output signal from the threshold processing circuit in accordance with inputting of a weak signal of a known pulse waveform shape to the noise adder, and wherein the noise strength set in the noise generator is determined based on, while a weak signal of a known pulse waveform shape is input in the noise adder, changing the noise strength set in the noise generator within a given range, obtaining a count number of a pulse signal component corresponding to each respective level of noise strength from a pulse counter that counts pulses based on the output signal from the threshold processing circuit, and determining a desired noise strength indicative of a count number corresponding to a desired SN ratio to be the noise strength for signal measurement.

5. A noise strength determining method in a signal processing device comprising a noise generator configured to have a noise strength set therein and to output a noise with a set noise strength, a noise adder configured to add the noise to an input signal including a weak signal as a measurement target to generate a noise-added signal, and a threshold processing circuit configured to perform threshold processing on the noise-added signal, the noise strength determining method comprising:

extracting, from an output signal output from the threshold processing circuit, a pulse signal component that meets a pulse waveform condition;

evaluating the extracted pulse signal; and setting, in the noise generator, a noise strength to a desired value according to an evaluation result based on evaluating the extracted pulse signal, and wherein the noise strength set in the noise generator is determined based on, while a weak signal of a known pulse waveform shape is input in the noise adder, changing the noise strength set in the noise generator within a given range, obtaining a count number of a pulse signal component corresponding to each respective level of noise strength from a pulse counter that counts pulses based on the output signal from the threshold processing circuit, and determining a desired noise strength indicative of a count number corresponding to a desired SN ratio to be the noise strength for signal measurement.

* * * * *